United States Patent
Schumann

(10) Patent No.: US 9,393,946 B2
(45) Date of Patent: Jul. 19, 2016

(54) DETECTION OF VACUUM BOOSTER LEAK TO ATMOSPHERE OR BOOSTER CHECKBALL MALFUNCTION

(71) Applicant: Continental Automotive Systems, Inc., Auburn Hills, MI (US)

(72) Inventor: Clinton Schumann, Royal Oak, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 5 days.

(21) Appl. No.: 14/561,532

(22) Filed: Dec. 5, 2014

(65) Prior Publication Data

US 2015/0166034 A1    Jun. 18, 2015

Related U.S. Application Data

(60) Provisional application No. 61/915,259, filed on Dec. 12, 2013.

(51) Int. Cl.
| | | |
|---|---|---|
| *G06F 7/70* | (2006.01) | |
| *G06G 7/00* | (2006.01) | |
| *B60T 17/22* | (2006.01) | |
| *B60T 13/52* | (2006.01) | |

(52) U.S. Cl.
CPC .............. *B60T 17/221* (2013.01); *B60T 13/52* (2013.01)

(58) Field of Classification Search
CPC .................................. B60T 17/221; B60T 13/52
See application file for complete search history.

(56) References Cited

U.S. PATENT DOCUMENTS

| | | | | |
|---|---|---|---|---|
| 3,712,176 | A * | 1/1973 | Meyers ................. | B60T 13/162 91/33 |
| 5,954,406 | A | 9/1999 | Sawada | |
| 5,967,628 | A * | 10/1999 | Abe .......................... | B60T 7/12 188/353 |
| 6,253,656 | B1 * | 7/2001 | Gilles ................... | B60T 8/3275 91/367 |
| 6,493,617 | B1 * | 12/2002 | Russell ................... | B60T 13/52 123/505 |
| 6,741,918 | B2 * | 5/2004 | Kerns ..................... | B60T 17/02 303/122.03 |
| 6,871,918 | B2 * | 3/2005 | Wild ....................... | B60T 17/18 303/114.3 |

(Continued)

FOREIGN PATENT DOCUMENTS

| | | |
|---|---|---|
| DE | 69731248 T2 | 3/2006 |
| DE | 102007003741 A1 | 11/2007 |

(Continued)

OTHER PUBLICATIONS

Machine_Translation_DE102011053516A1.

*Primary Examiner* — Bhavesh V Amin

(57) ABSTRACT

A method of operating a brake system comprises monitoring a vacuum pressure sensor with an ECU to determine an actual vacuum pressure in a vacuum booster for the brake system. The actual vacuum pressure is compared to a modeled vacuum pressure for the vacuum booster. When the actual vacuum pressure is different from the modeled vacuum pressure by a predetermined threshold difference the ECU determines either a booster leak to atmosphere or a booster checkball is malfunctioning. When the ECU determines that the booster is leaking to atmosphere or the booster checkball is malfunctioning an alert is provided.

4 Claims, 2 Drawing Sheets

(56) References Cited

U.S. PATENT DOCUMENTS

| | | | |
|---|---|---|---|
| 6,990,858 B2 * | 1/2006 | Kerns | B60T 13/52 701/30.7 |
| 7,878,053 B2 | 2/2011 | Lehner et al. | |
| 8,155,821 B2 | 4/2012 | Schubert et al. | |
| 8,177,309 B2 * | 5/2012 | Wang | B60K 6/48 303/115.3 |
| 2001/0035166 A1 * | 11/2001 | Kerns | B60T 17/02 123/494 |
| 2004/0162652 A1 * | 8/2004 | Kems | B60T 13/52 701/30.7 |
| 2009/0273230 A1 * | 11/2009 | Wang | B60K 6/48 303/122.09 |
| 2012/0227840 A1 * | 9/2012 | Lee | B60T 17/04 137/539 |
| 2012/0323433 A1 * | 12/2012 | Rollinger | G01M 3/26 701/29.1 |
| 2015/0166034 A1 * | 6/2015 | Schumann | B60T 13/52 701/70 |

FOREIGN PATENT DOCUMENTS

| | | |
|---|---|---|
| DE | 102007061123 A1 | 9/2008 |
| DE | 102011053516 A1 | 3/2013 |

\* cited by examiner

DETECTION OF VACUUM BOOSTER LEAK TO ATMOSPHERE OR BOOSTER CHECKBALL MALFUNCTION

CROSS-REFERENCE TO RELATED APPLICATIONS

This disclosure claims priority to U.S. Provisional Application No. 61/915,259, which was filed on Dec. 12, 2013 and is incorporated herein by reference.

TECHNICAL FIELD

The present invention relates to an electronically controlled hydraulic brake system. In normally aspirated engines, the engine provides a vacuum source, which is utilized by the brake system to provide additional braking force assistance via a vacuum assisted booster. An engine's vacuum level will fluctuate during driving based on inputs such as throttle position and load on the engine. The highest amount of vacuum is produced when the engine's throttle is not open, such as when the gas pedal is not depressed. During braking vacuum is displaced by atmospheric air and the vacuum is depleted, until replenished by the engine. A one wall check ball is placed between the booster and the engine to keep the vacuum at the highest level inside the booster. Therefore, prior to braking if the vacuum level provided by the engine decreases, the vacuum level in the booster will remain at the higher level, including if the engine is turned off.

Some engines do not provide adequate vacuum, and an external vacuum pump is utilized. The pump is usually based on vacuum level which is an input into the pump's control system. Many vehicle manufacturers are incorporating vacuum sensors to measure the vacuum at the brake booster. These measurements are used to provide information to actuate the external vacuum pump or to actuate brake system features. The features also amplify the brake system input force if the booster is not able to provide adequate assistance. The brake system can indicate a low vacuum situations and warn the driver. A low vacuum situation could come from a poorly running engine, malfunctioning booster vacuum checkball, leaking booster, leaking vacuum hoses or vacuum hose fitting. A low vacuum warning is relative to vacuum at the booster. The warnings are designed to indicate a low vacuum situation that could interfere with braking. Since, usually the red brake lamp is illuminated for a low vacuum warning, the system's warning settings are conservative to indicate an issue. Some vacuum malfunctions do not cause a braking issue, as they remain undetected; such as when the driver moves his foot from the throttle to the brake, this may provide enough time for the engine to provide adequate vacuum upon braking.

Some vehicle employ engines with start stop technology, whereby the engine is turned off at standstill for increased fuel economy. The start stop system monitors the driver's intent to drive off relative to restarting the engine. The driver's brake pedal actuation is monitored to provide a precursor indication the driver will be requesting the engine to start up. Usually the pedal force is measured via master cylinder pressure, as a low or decreasing value could indicate the driver will be requesting the vehicle to accelerate in the near future. Also, when the engine restarts some vehicles have torque surges into the drive line. These surges can be masked by the brake system holding the brake pressure while the engine restarts. The start stop system may also be directly monitoring the booster vacuum level to insure there is adequate vacuum pressure of the brake system while the engine is turned off.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A brake system comprises a master cylinder, a plurality of wheel brakes connected to the master cylinder to apply a brake pressure at each of a plurality of vehicle wheels, and an electronic control unit connected to the master cylinder to control pressure within the brake system. The electronic control unit includes instructions for monitoring a vacuum pressure sensor to determine an actual vacuum pressure in a vacuum booster for the brake system; comparing the actual vacuum pressure to a modeled vacuum pressure for the vacuum booster; determining a booster checkball is malfunctioning when the actual vacuum pressure is different from the modeled vacuum pressure by a predetermined threshold difference; and providing an alert when the booster checkball is determined to be malfunctioning.

A method of operating a brake system comprises monitoring a vacuum pressure sensor with an ECU to determine an actual vacuum pressure in a vacuum booster for the brake system. The actual vacuum pressure is compared to a modeled vacuum pressure for the vacuum booster. When the actual vacuum pressure is different from the modeled vacuum pressure by a predetermined threshold difference the ECU determines either a booster leak to atmosphere or a booster checkball is malfunctioning. When the ECU determines that the booster is leaking to atmosphere or the booster checkball is malfunctioning an alert is provided.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
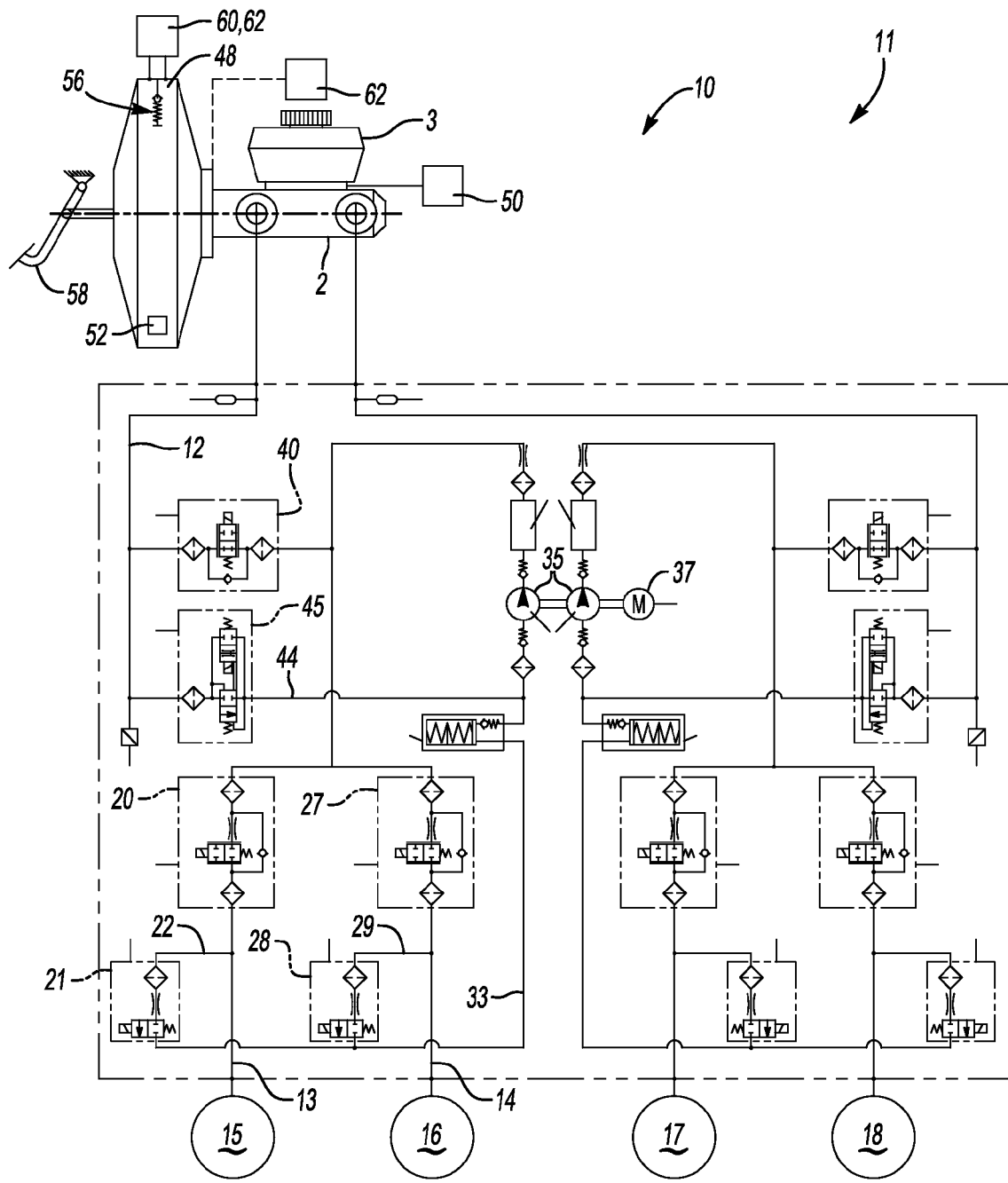
FIG. 1 is a schematic illustration of a vehicle having a hydraulic brake system of the present invention.
Figure 2:
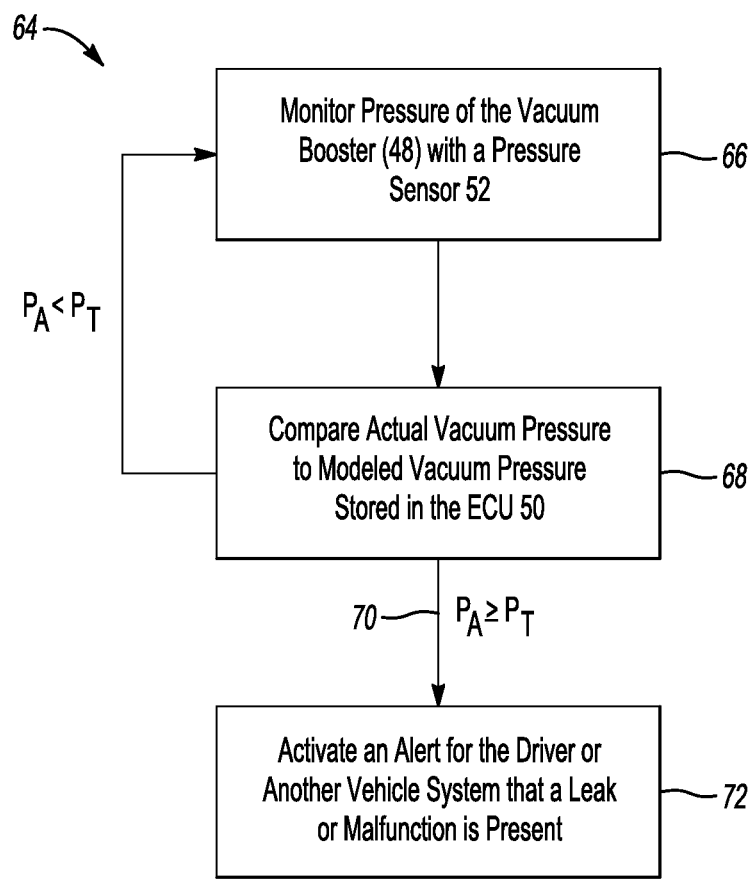
FIG. 2 is a schematic illustration of a method of operating the hydraulic brake system of FIG. 1.

The following description is merely exemplary in nature and is in no way intended to limit the disclosure, its application, or uses. For purposes of clarity, the same reference numbers will be used in the drawings to identify similar elements. FIGS. 1 and 2 show a hydraulic dual-circuit brake system 10 for a motor vehicle 11 capable of performing anti-lock brake control as well as active interventions for traction control, ESC, ARP, and the like. The brake system 10 has a pedal-actuated tandem master brake cylinder 2 with a brake fluid reservoir 3. Both brake circuits of the shown brake system 10 have the same set-up.

The brake line 12 begins at the master brake cylinder 2 and splits into two inlet lines 13 and 14. Inlet line 13 leads to a wheel brake 15 and inlet line 14 leads to a wheel brake 16.

A valve assembly that comprises an inlet valve 20 disposed in the inlet line 13 and an outlet valve 21 that is located in a return line 22 is associated with the wheel brake 15. The inlet valve 20 has a spring-actuated open position and an electromagnetically switchable blocking position. The outlet valve 21 has a spring-actuated blocking position and an electromagnetically switchable open position. A one-way valve 23 is disposed in the inlet line 13 parallel to the inlet valve 20. The two-position valves 20 and 21 of the valve assembly also serve the purpose of brake pressure modulation; in switching positions and, a brake pressure build-up is possible in the wheel brake 15, while in the switching positions and, pressure holding and in switching positions and pressure reduction in wheel brake 15 are possible.

Another valve assembly is likewise associated with the wheel brake 16 and similar to the valve assembly associated with wheel brake 15 comprises an inlet valve 27 in the inlet line 14 and an outlet valve 28 in a return line 29. A one-way valve 30 is connected parallel to the inlet valve 27 in the inlet line 14. The two-position valves 27 and 28 of the valve assembly 26 again have the purpose of modulating the pressure in the wheel brake 16.

The return lines 22 and 29 originating at the inlet lines 13 and 14 between the two-position valves 20 and 27 and the wheel brakes 15 and 16 are united in a return line 33 that is connected to the brake line 12. A low-pressure accumulator 34 communicates with the return line 33. Essentially disposed downstream of the low-pressure accumulator 34 in the return line 33 are a pump 35 and motor 37, a damper chamber 36, and a throttle. The pump 35 is a self-priming pump.

A shut-off valve 40 with a parallel-connected one-way bypass valve 41 is disposed in the brake line 12 between the master brake cylinder 2 and the connection of the return line 33. The shut-off valve 40 has a spring-actuated open position and an electromagnetically switchable blocking position. In its blocking position, the shut-off valve 40 includes a pressure limiting function, which prevents excessive pressure build-up in the brake line below the shut-off valve 40.

A bypass line 44 begins at the brake line 12 between the master brake cylinder 2 and the shut-off valve 40. Disposed in the bypass line 44 is a switch-over valve 45 having one spring-actuated closed position and one electromagnetically switchable open position. The bypass line 44 is connected to the return line 33 between the inlet side of the self-priming pump 35 and the low-pressure accumulator 34.

The brake system 10 includes an electronic control unit (ECU) 50, which can evaluate signals from various sensors that monitor the rotational behavior of the vehicle 11, e.g. wheel speed sensors. The ECU 50 controls the pump 35 and valves 20, 21, 27, 28, 40, 45 in accordance with a situation-specific control algorithm and, in the event that the demands of two control algorithms are in conflict with each other, arbitrates the demands to find a compromise or to give priority to one of them over the other. The brake system shown 10 is capable of performing active brake interventions, i.e. of building up brake pressure independent of the driver's operation of the brake pedal 58.

The ECU 50 is connected to the master brake cylinder 2, the pump 35, and valves 20, 21, 27, 28, 40, 45 to control pressure within the brake system 10. The brake system 10 also includes a pressure sensor 52 for monitoring pressure within a vacuum booster 48, for the brake system 10. The vacuum booster 48 includes a vacuum checkball 56 to provide one-way flow from an engine 62 into the vacuum booster 48. If the checkball 56 malfunctions or leaks, the vacuum pressure within the booster 48 is lowered. The decreased vacuum pressure may not be a sufficient lowering of vacuum to provide a low pressure warning from the brake system 10. However, it would be useful to indicate when a checkball 56 malfunctions or the vacuum booster 48 leaks to atmosphere prior to reaching low pressure warning levels in order maintain efficient braking by the brake system 10.

The ECU 50 may monitor the pressure sensor 52 in the vacuum booster 48. Preferable, the ECU 50 monitors the pressure sensor 52 when the engine 62 is turned off, and the brakes 15, 16 are not actively being applied, i.e. the driver is not actively depressing the brake pedal 58. In this instance, the brake system can robustly be used to indicate a booster 48 with a leak to atmosphere or a malfunctioning booster vacuum checkball 56 as the source of the malfunction.

In one embodiment the ECU monitors the vacuum sensor's signal 52 and will indicate that the booster 48 is leaking to atmosphere, or that the booster vacuum checkball 56 is malfunctioning. The ECU 50 monitoring may include modeling an engine 62 under different operating conditions and then comparing the model to the actual booster 48 vacuum level or by comparing the booster vacuum level to a model based on other engine sensors. However, modeling vacuum during driving can be difficult, since every engine has a different vacuum signature. Additionally, vacuum level may fluctuate when the driver depresses the brake pedal 58 and when the vacuum pump 35 is actuated. Therefore, in one embodiment the monitoring of the brake booster 48 vacuum occurs when the engine 62 is turned off and the driver is no actively braking. When the vacuum source is removed (engine off) a booster 48 leaking to atmosphere, or a malfunctioning booster checkball 56 has a vacuum signal signature significantly different that a fully functioning system. For example, a fully functioning system does not decrease the vacuum level to zero without fluctuations.

Determining when the vacuum booster 48 is malfunctioning can help to keep the brake system 10 to operating efficiently. A malfunctioning, i.e. leaking, vacuum system can cause excessive cycling of the vacuum pump 35; if the vehicle is equipped with a vacuum pump 34. Additionally, as vacuum level of the booster 35 decreases the amount of brake assist decreases. Leading to a less efficient braking system 10.

For vehicles with engine start stop systems, if the ECU 50 is not checking for malfunctions then the engine start stop system must monitor the overall vacuum level to ensure the braking system has adequate vacuum. Malfunctioning vacuum systems will cause low vacuum levels which will lead to the engine start stop system starting the engine to provide the necessary vacuum. This would reduce fuel economy relative to a non-malfunctioning brake system, decreasing the efficiency of the engine start stop system. Monitoring of the booster 48 vacuum level by the ECU 50 will allow the brake system 10 to determine if a malfunction is occurring and provide an alert, to the driver or the engine start stop system 60 to avoid the efficiency.

Additionally, for vehicles 11 with a start stop engine 62 system decreasing master cylinder 2 pressure is viewed as an indication that the driver is releasing the brake pedal 58 and going to request the vehicle 11 to accelerate, whereby the engine 68 should be started. For a malfunctioning system 10, a constant force on the brake pedal 58 will cause the master cylinder 2 pressure to decrease as the booster 48 vacuum level decreases. With a vacuum leak the engine 68 would be starting based on the master cylinder 2 pressure, which is influenced by the vacuum and not the actual driver's intent, thereby reducing the benefit of the engine 68 start stop system. Therefore, vacuum system 48 malfunction can lead to a false indication of a driver's intent if the engine start stop system is monitoring the master cylinder 2 pressure to determine driver intent for an engine torque demand. As above, monitoring of the booster 48 vacuum level by the ECU 50 will allow the brake system 10 to determine if a malfunction is occurring and provide an alert, to the driver or the engine start stop system 60 to avoid the efficiency.

The engine 62 start stop system can also monitor the master cylinder 2 pressure to insure the braking system 10 has enough force to hold the vehicle 11 on a hill or upon restart. If the vacuum was leaking, the master cylinder 2 pressure would decrease to a low level and could cause the engine to start earlier than a system 10 without a vacuum issue, reducing the system's effectiveness. Again, monitoring of the booster 48 vacuum level by the ECU 50 will allow the brake system 10 to determine if a malfunction is occurring and provide an alert, to the driver or the engine start stop system 60 to avoid the efficiency.

A method of operating a brake system 10, illustrated in FIG. 2 at 64, comprises monitoring a vacuum pressure sensor 52 with an ECU 50 to determine an actual vacuum pressure in a vacuum booster 48 for the brake system 10, step 66. The actual vacuum pressure is compared to a modeled vacuum pressure for the vacuum booster 48, step 68. The ECU 50 determines that the booster 48 is leaking to atmosphere or a booster checkball 54 is malfunctioning, when the actual vacuum pressure is different ($P_A$) from the modeled vacuum pressure by a predetermined threshold difference ($P_T$), step 70. An alert is provided to the driver or another vehicle system when the ECU 50 determines that the booster 48 is leaking to atmosphere or the booster checkball 54 is malfunctioning, step 72.

The method of operating a brake system 10 also includes monitoring of the actual vacuum pressure when an engine for the vehicle 11 is turned off and the brakes 15, 16 are not being applied.

The method of operating a brake system 10 also includes determining the booster 48 is leaking to atmosphere or the booster checkball 54 is malfunctioning when the actual vacuum level decreases to zero without fluctuations in the actual vacuum level.

A brake system 10 comprises a master cylinder 2, a plurality of wheel brakes 15, 16 connected to the master cylinder 2 to apply a brake pressure at each of a plurality of vehicle wheels, and an electronic control unit 50 connected to the master cylinder 2 to control pressure within the brake system 10. The electronic control unit 50 includes instructions for monitoring a vacuum pressure sensor 52 to determine an actual vacuum pressure in a vacuum booster 48 for the brake system 10. The actual vacuum pressure is compared to a modeled vacuum pressure for the vacuum booster 48. The ECU 50 determines that the booster 48 is leaking to atmosphere or a booster checkball 54 is malfunctioning, when the actual vacuum pressure is different from the modeled vacuum pressure by a predetermined threshold difference. An alert is provided to the driver or another vehicle system when the ECU 50 determines that the booster 48 is leaking to atmosphere or the booster checkball 54 is malfunctioning.

The ECU 50 also includes instructions for monitoring of the actual vacuum pressure when an engine for the vehicle 11 is turned off and the brakes 15, 16 are not being applied.

The ECU 50 also includes instructions for determining the booster 48 is leaking to atmosphere or the booster checkball 54 is malfunctioning when the actual vacuum level decreases to zero without fluctuations in the actual vacuum level.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A method of operating a brake system comprising:
monitoring a vacuum pressure sensor with an ECU to determine an actual vacuum pressure in a vacuum booster for the brake system, wherein the monitoring of the actual vacuum pressure occurs when an engine for the vehicle is turned off and the brakes are not being applied;
comparing the actual vacuum pressure to a modeled vacuum pressure for the vacuum booster;
determining one of: a booster leak to atmosphere and a booster checkball is malfunctioning, when the actual vacuum pressure is different from the modeled vacuum pressure by a predetermined threshold difference; and
providing an alert when the ECU determines that one of the booster is leaking to atmosphere and the booster checkball is malfunctioning.

2. A method of operating a brake system comprising:
monitoring a vacuum pressure sensor with an ECU to determine an actual vacuum pressure in a vacuum booster for the brake system;
comparing the actual vacuum pressure to a modeled vacuum pressure for the vacuum booster;
determining one of: a booster leak to atmosphere and a booster checkball is malfunctioning when the actual vacuum level decreases to zero without fluctuations in the actual vacuum level; and
providing an alert when the ECU determines that one of the booster is leaking to atmosphere and the booster checkball is malfunctioning.

3. A brake system comprising:
a master cylinder;
a plurality of wheel brakes connected to the master cylinder to apply a brake pressure at each of a plurality of vehicle wheels; and
an electronic control unit connected to the master cylinder to control pressure within the brake system the electronic control unit including instructions for:
monitoring a vacuum pressure sensor when an engine for the vehicle is turned off and the brakes are not being applied to determine an actual vacuum pressure in a vacuum booster for the brake system;
comparing the actual vacuum pressure to a modeled vacuum pressure for the vacuum booster;
determining a booster checkball is malfunctioning when the actual vacuum pressure is different from the modeled vacuum pressure by a predetermined threshold difference; and
providing an alert when the booster checkball is determined to be malfunctioning.

4. A brake system comprising:
a master cylinder;
a plurality of wheel brakes connected to the master cylinder to apply a brake pressure at each of a plurality of vehicle wheels; and
an electronic control unit connected to the master cylinder to control pressure within the brake system the electronic control unit including instructions for:
monitoring a vacuum pressure sensor to determine an actual vacuum pressure in a vacuum booster for the brake system;

comparing the actual vacuum pressure to a modeled vacuum pressure for the vacuum booster;
determining a booster checkball is malfunctioning when the actual vacuum level decreases to zero without fluctuations in the actual vacuum level; and
providing an alert when the booster checkball is determined to be malfunctioning.

\* \* \* \* \*